United States Patent
Yoshihara et al.

(10) Patent No.: US 10,436,648 B2
(45) Date of Patent: Oct. 8, 2019

(54) TEMPERATURE SENSOR (71) Applicant: SHIBAURA ELECTRONICS CO., LTD., Saitama-shi, Saitama (JP)

(72) Inventors: Takamasa Yoshihara, Saitama (JP); Michiru Takemura, Senboku (JP)

(73) Assignee: SHIBAURA ELECTRONICS CO., LTD., Saitama-Shi, Saitama (JP)

( * ) Notice: Subject to any disclaimer, the term of this patent is extended or adjusted under 35 U.S.C. 154(b) by 283 days.

(21) Appl. No.: 15/540,710

(22) PCT Filed: Nov. 30, 2015

(86) PCT No.: PCT/JP2015/005952
§ 371 (c)(1),
(2) Date: Jun. 29, 2017

(87) PCT Pub. No.: WO2016/120929
PCT Pub. Date: Aug. 4, 2016

(65) Prior Publication Data
US 2018/0017446 A1 Jan. 18, 2018

(30) Foreign Application Priority Data
Jan. 29, 2015 (JP) .................................. 2015-015613

(51) Int. Cl.
*G01K 1/00* (2006.01)
*G01K 7/00* (2006.01)
(Continued)

(52) U.S. Cl.
CPC ................. *G01K 1/14* (2013.01); *G01K 1/16* (2013.01); *H02K 11/25* (2016.01); *G01K 1/08* (2013.01)

(58) Field of Classification Search
USPC .................................. 374/208, 152, 163, 141
See application file for complete search history.

(56) References Cited

U.S. PATENT DOCUMENTS 5,366,291 A 11/1994 Nakagama et al.
6,779,919 B1 * 8/2004 Staniforth ............. G01K 1/143
248/231.51

(Continued)

FOREIGN PATENT DOCUMENTS

CN 2802474 Y 8/2006
DE 10327493 A1 1/2005
(Continued)

OTHER PUBLICATIONS

Translation of DE 10327493, Jan. 20, 2005 (Year: 2005).*
(Continued)

*Primary Examiner* — Mirellys Jagan
(74) *Attorney, Agent, or Firm* — Pearne & Gordon LLP (57) ABSTRACT To provide a temperature sensor that can be attached to or removed from a neutral line without skilled technique, a temperature sensor is attached to a rectangular coil and detects temperature of the coil. The temperature sensor includes: a sensor holder extending from front end side toward back end side; a sensor body that is held by the sensor holder to locate a thermosensitive device on the front end side and from which lead wires are drawn toward the back end side, the lead wires being electrically connected to the thermosensitive device; and a clip that is fixed to the sensor holder and presses the coil against the sensor body by elastic force.

15 Claims, 5 Drawing Sheets

(51) Int. Cl.
*G01K 13/00* (2006.01)
*G01K 1/14* (2006.01)
*G01K 1/16* (2006.01)
*H02K 11/25* (2016.01)
*G01K 1/08* (2006.01)

(56) References Cited

U.S. PATENT DOCUMENTS

2007/0116087 A1* 5/2007 Hsu ..................... G01K 1/143
374/147
2009/0252199 A1* 10/2009 Liu ..................... G01K 1/146
374/208
2010/0134703 A1 6/2010 Kanbara

FOREIGN PATENT DOCUMENTS

| JP | H05150685 A | 6/1993 |
| JP | 2000-002593 A | 1/2000 |
| JP | 2010066052 A | 3/2010 |
| JP | 2013121183 A | 6/2013 |

OTHER PUBLICATIONS

European Search Report for EP 15 87 9829 dated Jan. 22, 2018.
International Search Report for PCT/2015/005952 dated Dec. 22, 2015.
European Office Action for Application No. 15879829.8, dated Sep. 12, 2018.

* cited by examiner

TEMPERATURE SENSOR

This is a National Stage application of PCT international application PCT/JP2015/005952, filed on Nov. 30, 2015 which claims the priority of Japanese Patent Application No. 2015-015613, filed Jan. 29, 2015, both of which are incorporated herein by reference in their entirety.

TECHNICAL FIELD

The present invention relates to a sensor suitable for detection of temperature of a coil that serves as a neutral line provided in a stator of a rotary electric machine.

BACKGROUND ART

When a current flows through a coil provided in a stator of a rotary electric machine, the coil generates heat to increase the temperature of the stator. If the temperature of the stator becomes equal to or higher than predetermined heat resistant temperature, components of the stator may be damaged by the heat. Therefore, when the detected temperature of the temperature sensor that is provided in the coil is equal to or higher than predetermined temperature, the current supplied to the coil is interrupted or suppressed to prevent the temperature increase of the stator.

Some of the rotary electric machines supplied with AC power include a neutral point that connects coil ends of respective phases, and temperature of the neutral line in an on-vehicle rotary electric machine is detected. As an example, Patent Literature 1 proposes a rotary electric machine, a temperature sensor of which is more easily replaced when a temperature detection device is broken down.

CITATION LIST

Patent Literature

Patent Literature 1: JP2013-121183A

SUMMARY OF INVENTION

Technical Problem

In the proposition of Patent Literature 1, however, to replace the temperature sensor, it is necessary to remove the neutral line in which the temperature sensor is attached, from a neutral line welded part, and to weld a new neutral line in which a new temperature sensor is attached, to the neutral line welded part. Therefore, the proposition of Patent Literature 1 makes it possible to replace the temperature sensor; however, welding technique is necessary for replacement of the temperature sensor because welding is involved.

Therefore, an object of the present invention is to provide a temperature sensor that is attached to or removed from a neutral line without skilled technique.

Solution to Problem

A temperature sensor according to the present invention is attached to a rectangular electric wire configuring a stator of a rotary electric machine and detects temperature of the electric wire. The temperature sensor includes: a sensor holder extending from front end side toward back end side; a sensor body that is held by the sensor holder to locate a thermosensitive device on the front end side and from which lead wires are drawn toward the back end side, the lead wires being electrically connected to the thermosensitive device; and a clip that is fixed to the holder and presses the electric wire against the sensor body by elastic force.

In the temperature sensor according to the present invention, the clip is fixed on the front end side of the sensor holder, and presses, by the elastic force, the electric wire toward a region including a position of the sensor body at which the thermosensitive device is provided.

Accordingly, it is possible to bring the front end side of the sensor body at which the thermosensitive device is provided into tight contact with the electric wire, which allows for temperature detection of the electric wire with high accuracy. In addition, adjusting the elastic force of the clip makes it possible to surely apply pressing force necessary for the temperature detection.

In the temperature sensor according to the present invention, the clip is made of a metal plate that is bent in a U-shape. The clip includes a fixing arm, a spring part, and a holding arm. The fixing arm is integrally fixed to the sensor holder and projects in a cantilever shape to outside of the holder in a width direction. The spring part is continuous with the fixing arm. The holding arm is continuous with the spring part and faces the fixing arm with a predetermined distance in between. The clip presses the electric wire against the sensor body through an insulation bracket that is provided on the holding arm.

Configuring the clip by a metal excellent in heat resistance makes it possible to maintain the force of pressing the electric wire against the sensor body for a long time. This makes it possible to stably secure the temperature detection with high accuracy for a long time.

In addition, since the elastic force of the clip is indirectly applied to the electric wire through the insulation bracket, it is possible to reduce influence of surrounding temperature to temperature variation of the electric wire. In other words, the insulation bracket blocks transfer of surrounding heat to the electric wire through the metal clip having high thermal conductivity while realizing insulation between the electric wire and the clip. In addition, since the back surface of the sensor body is covered with the insulation bracket, it is possible to block transfer of surrounding heat to the sensor body. This allows for the temperature detection with high accuracy.

In the temperature sensor according to the present invention, a connection end portion of the spring part connected to the fixing arm may preferably have curvature different from curvature of a connection end portion of the spring part connected to the holding arm.

Rigidity of the spring having a curvature part is typically increased as the curvature is increased. Therefore, restoring force after application of elastic displacement, namely, force of pressing the sensor body against the electric wire in this case is enhanced. In addition, when the curvature is set small, the spring part is so deformed as to expand the opening around the part having the small curvature, when attaching the sensor body to the electric wire. Therefore, adjusting the curvature at the two points makes it possible to optimize deformation in the attachment of the sensor body to the electric wire to improve attachment workability, and to optimize the force of pressing the sensor body against the electric wire after attachment.

In the temperature sensor according to the present invention, the insulation bracket may preferably include a holding groove that holds the electric wire, on a side facing the sensor holder. The holding groove may be preferably provided between a front upstanding part and a rear upstanding part. The front upstanding part may be preferably provided on side close to an opening into which the electric wire is inserted, and the rear upstanding part may be preferably provided oppositely to the front upstanding part. The front upstanding part may preferably have a height lower than a height of the rear upstanding part.

The rear upstanding part is made higher in height than the front upstanding part, which causes the electric wire to abut on the rear upstanding part after the electric wire passes through the guide surface of the front upstanding part. This results in positioning of the electric wire to the holding groove in the insertion direction without special consideration.

In the temperature sensor according to the present invention, the front upstanding part may preferably include a top surface facing the opening. The top surface may preferably configure a guide surface that is inclined to gradually decrease a distance between the guide surface and the opposing sensor holder toward the holding groove.

The guide surface is provided on the insulation bracket. Accordingly, the opening is the widest on the side into which the electric wire is inserted and is decreased toward the holding groove. This facilitates attachment of the temperature sensor to the electric wire.

The temperature sensor according to the present invention may further include a lead wire fastener that is fixed to the sensor holder. The lead wire of the sensor body is folded toward the front end side at the back end side of the sensor holder, and the lead wire fastener holds a folded portion of the lead wire.

Therefore, the sensor holder holds, through the electric wire, the sensor body by the elastic force of the clip, and the sensor holder holds the sensor body through restriction of the motion of the folded portion of the lead wire by the lead wire fastener on the back end side. This causes the sensor body to be stably held by the sensor holder. Even if vibration is applied to the electric wire and the temperature sensor, it is possible to suppress reduction of accuracy of the detected temperature caused by displacement of the sensor body.

Advantageous Effects of Invention

The temperature sensor according to the present invention is easily attached to or removed from the electric wire without skilled technique such as welding because the sensor body is brought into tight contact with the rectangular electric wire by the elastic force occurred on the clip.

BRIEF DESCRIPTION OF DRAWINGS

FIGS. 1A and 1B are perspective views illustrating a temperature sensor according to an embodiment of the present invention attached to a rectangular coil, in which FIG. 1A is a diagram as viewed from side close to the temperature sensor and FIG. 1B is a diagram as viewed from side close to the rectangular coil.

FIGS. 2A and 2B are diagrams illustrating the temperature sensor of FIGS. 1A and 1B, in which FIG. 2A is a front view, FIG. 2B is a plan view, and FIG. 2C is a back view.

FIGS. 5A and 5B are back views illustrating a process of attaching the temperature sensor of FIGS. 1A and 1B to the coil, in which FIG. 5A is a diagram illustrating a state before the attachment and FIG. 5B is a diagram illustrating a state after the attachment.

DESCRIPTION OF EMBODIMENTS

The present invention is described below based on an embodiment illustrated in accompanying drawings.

Figure 1A:
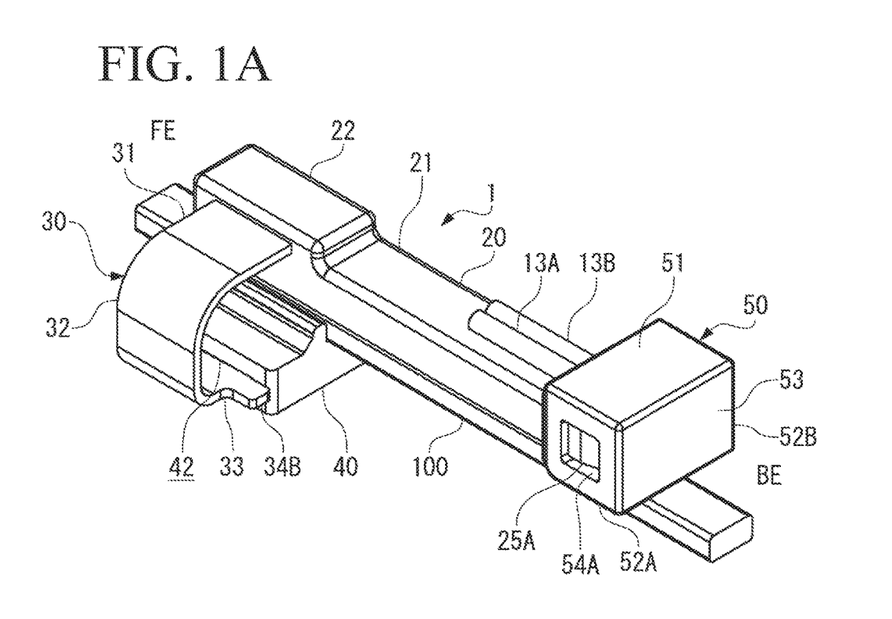
Figure 1B:
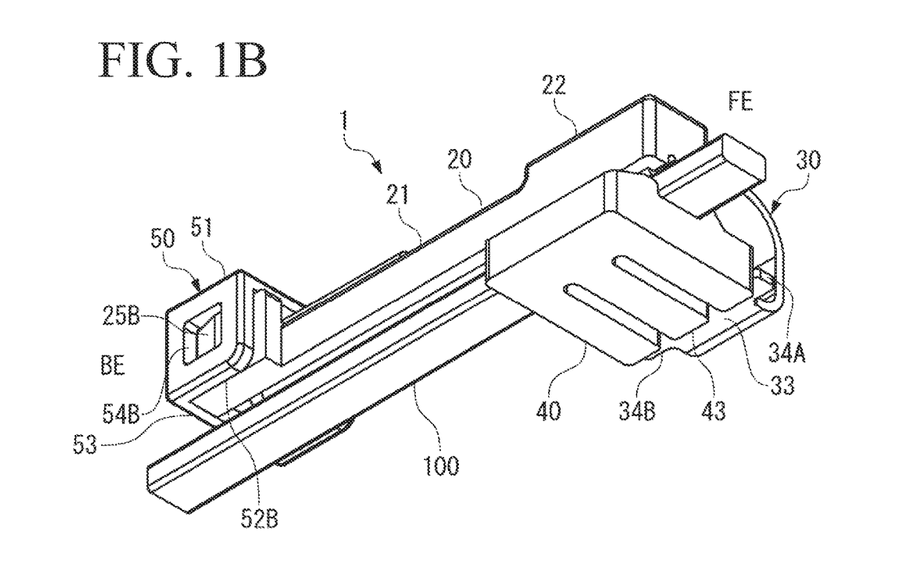
Figure 2A:
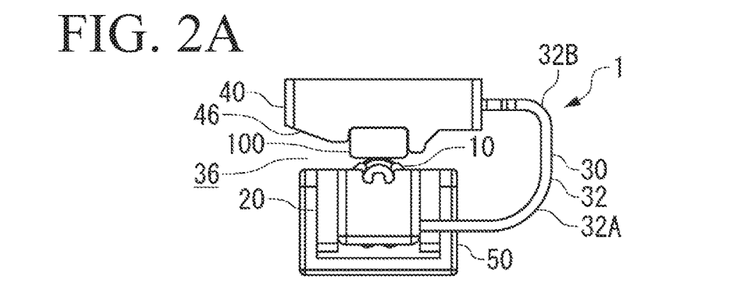
Figure 2B:
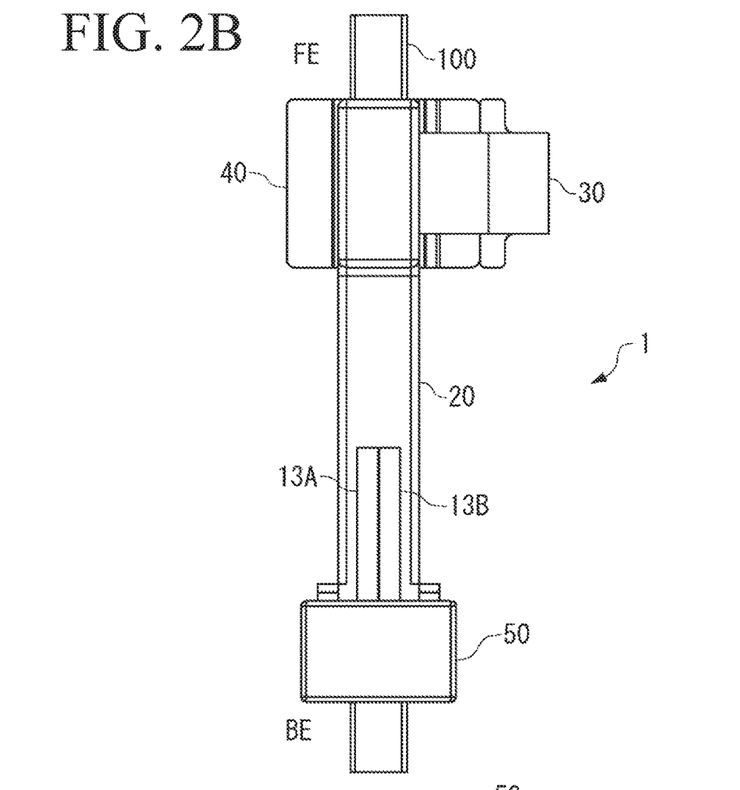
Figure 2C:
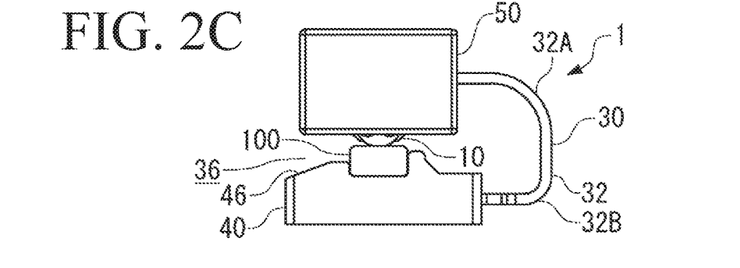

As illustrated in FIG. 1 and FIG. 2, a temperature sensor 1 according to the present embodiment is attached to a rectangular coil 100 by a clip 30, and detects temperature of the coil 100. The coil 100 is assumed to serve as a neutral line provided in a stator of a rotary electric machine, and a portion of the neutral line is illustrated as the coil 100 in FIG. 1.

As illustrated in FIGS. 1A, 1B and FIGS. 2A to 2C, the temperature sensor 1 includes: a sensor body 10; a sensor holder 20 that holds the sensor body 10; and the clip 30 that is integrally fixed to one end of the sensor holder 20 and holds the coil 100 by elastic force. The temperature sensor 1 further includes: an insulation bracket 40 that is fixed to the clip 30 and holds the coil 100 while realizing insulation between the clip 30 and the coil 100; and a lead wire fastener 50 that holds lead wires 13A and 13B in a folded state. The lead wires 13A and 13B are drawn from the sensor body 10 on the other end of the sensor holder 20. The respective components are described below in order.

[Sensor Body 10]

The sensor body 10 includes: a thermosensitive device 11; a pair of lead-out wires 12A and 12B that are drawn from the thermosensitive device 11; and the lead wires 13A and 13B that are respectively connected to the lead-out wires 12A and 12B. Note that side on which the thermosensitive device 11 is disposed while the sensor body 10 is held by the sensor holder 20 is defined as a front end of the temperature sensor 1, and side from which the lead wires 13A and 13B are drawn is defined as a back end. The front end is denoted by FE and the back end is denoted by BE in FIG. 1A to FIG. 4.

For example, a thermistor having temperature characteristics in electric resistance may be used for the thermosensitive device 11. For example, a Dumet wire may be used for the lead-out wires 12A and 12B, and the lead-out wires 12A and 12B are electrically connected to the thermosensitive device 11 through an unillustrated electrode. In addition, the lead wires 13A and 13B are respectively configured of stranded wires and cover layers 14A and 14B. The stranded wires are each formed by twisting thin wires, and the cover layers 14A and 14B cover the respective stranded wires. The lead wires 13A and 13B are connected to an unillustrated temperature measurement circuit through another electric wires as necessary. Note that each of the cover layers 14A and 14B is formed with use of a fluorine resin made of polytetrafluoroethylene (PTFE) or tetrafluoroethylene-perfluoroalkylvinylether copolymer (PFA).

Figure 3:
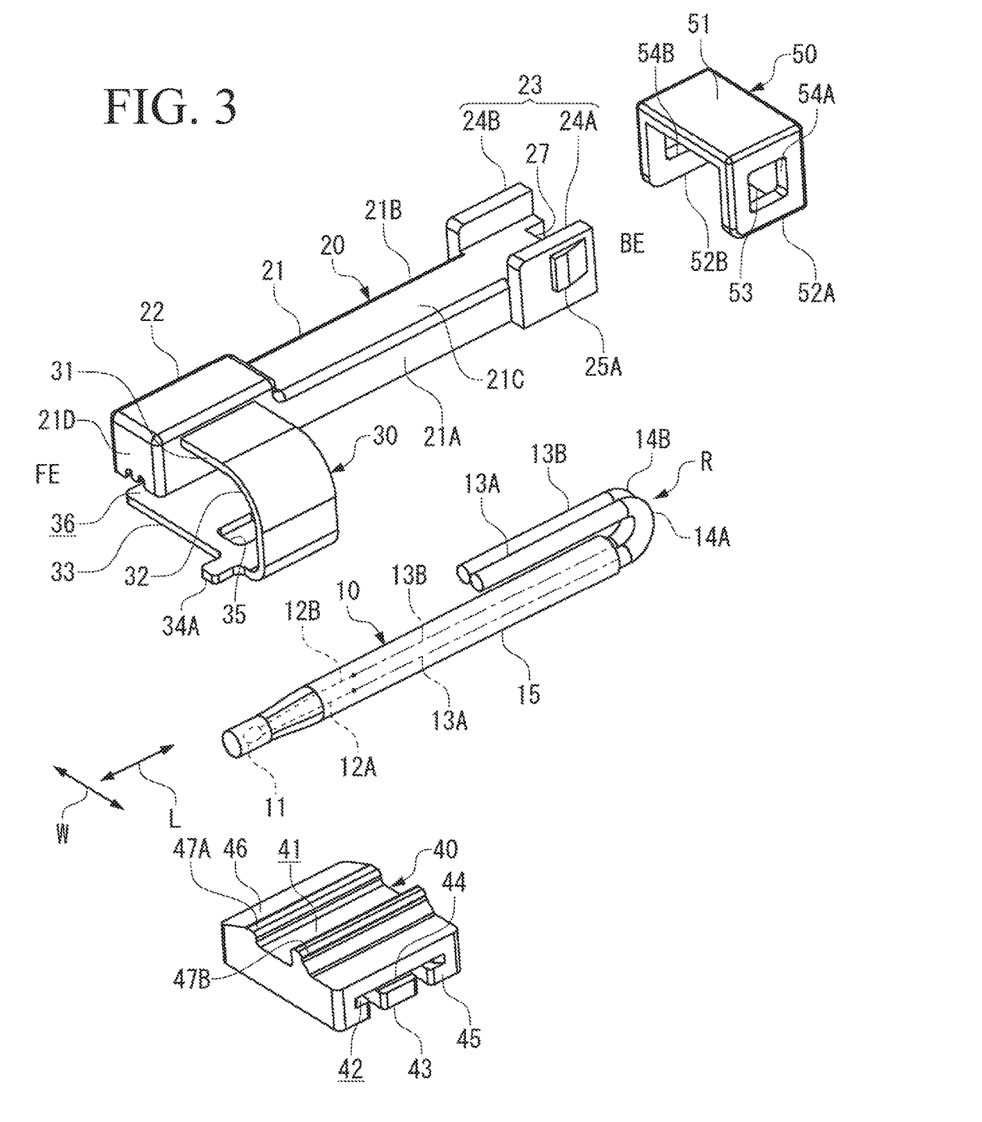
FIG. 3 is an exploded perspective view of the temperature sensor of FIGS. 1A and 1B.
Figure 4:
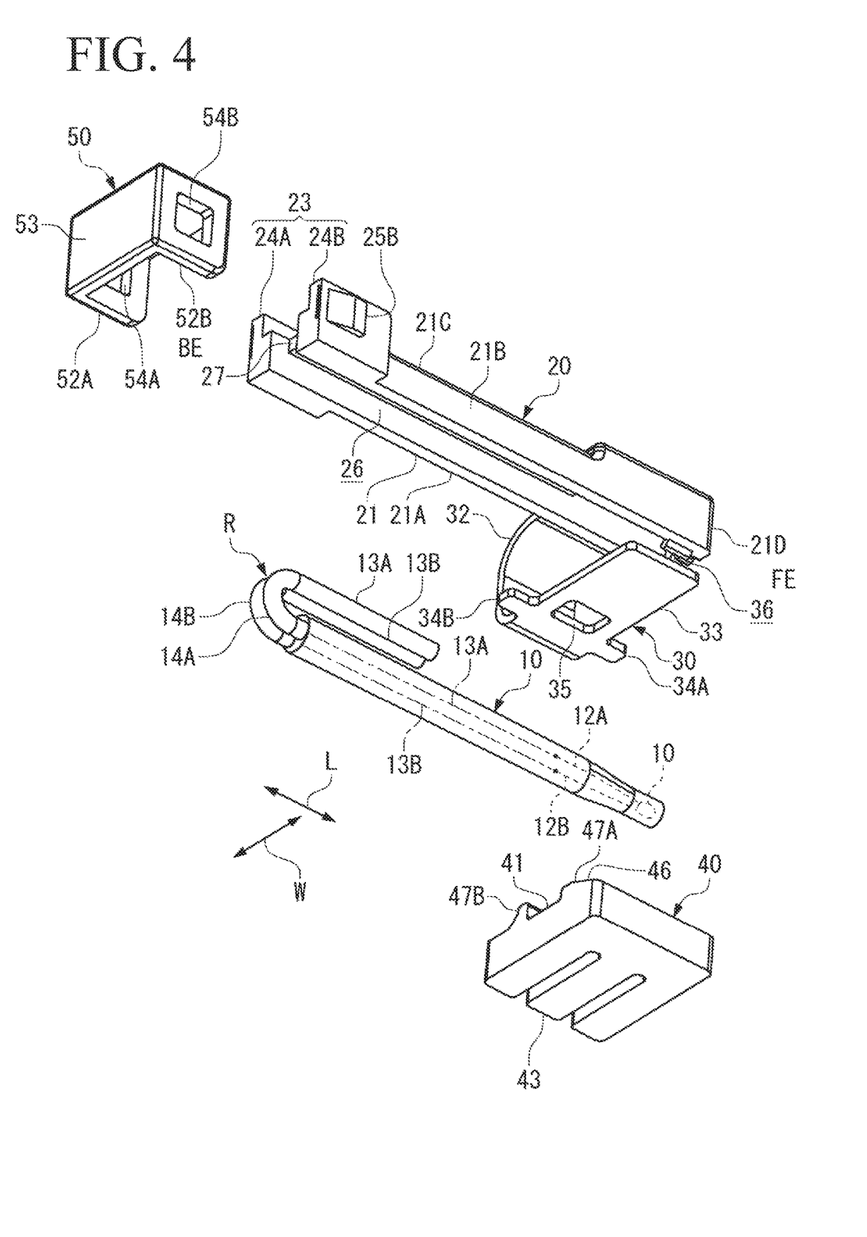
FIG. 4 is an exploded perspective view of the temperature sensor of FIGS. 1A and 1B as viewed from a direction different from the direction of FIG. 3.

As illustrated in FIG. 3 and FIG. 4, the sensor body 10 includes a cover layer 15 that covers the thermosensitive device 11, the lead-out wires 12A and 12B, and portions of the lead wires 13A and 13B, thereby protecting the thermosensitive device 11 and the wires from surrounding environment. The cover layer 15 is also formed of a resin similar to the resin of the cover layers 14A and 14B.

[Sensor Holder 20]

The sensor holder 20 is a member that houses and holds the sensor body 10, and components described below of the sensor holder 20 are integrally formed through injection molding of a resin.

As illustrated in FIG. 3 and FIG. 4, the sensor holder 20 includes: a holder body 21 that extends from the front end to the back end; a clip fixing part 22 that is provided at the front end of the holder body 21; and a fastener fixing part 23 that is provided at the back end of the holder body 21. The sensor holder 20 has a substantially prism-shaped appearance.

The holder body 21 includes: a pair of side walls 21A and 21B; a top wall 21C that connects the side walls 21A and 21B to each other on the top surface side; and a front wall 21D that connects the side walls 21A and 21B to each other on the front surface side. The holder body 21 has a housing groove 26 that opens on a bottom surface facing the top wall 21C and houses the sensor body 10.

As illustrated in FIG. 3 and FIG. 4, the clip fixing part 22 so projects as to be higher in height than the top wall 21C, and the sensor holder 20 integrally fixes the clip 30 by the resin mold at the clip fixing part 22.

As illustrated in FIG. 3 and FIG. 4, the fastener fixing part 23 includes spacers 24A and 24B and lock claws 25A and 25B. The spacers 24A and 24B are respectively provided on the side walls 21A and 21B. The lock claws 25A and 25B are respectively provided on the spacers 24A and 24B.

The spacers 24A and 24B form, together with the lead wire fastener 50, a space into which the lead wires 13A and 13B folded at the back end of the sensor holder 20 are inserted. Therefore, the spacers 24A and 24B are so formed as to project from the top wall 21C by a predetermined length.

The lock claws 25A and 25B are respectively inserted into lock holes 54A and 54B of the lead wire fastener 50, thereby locking the lead wire fastener 50 to the sensor holder 20. As a result, the lead wire fastener 50 holds a folded portion R of the lead wires 13A and 13B and prevents the sensor body 10 that is housed in the housing groove 26, from coming off from the housing groove 26 on the back end side.

As illustrated in FIG. 4, the housing groove 26 is provided from the back end to the front end of the holder body 21, and houses therein the sensor body 10.

The back end of the housing groove 26 opens and the front end is separated from the outside by the front wall 21D. The front end of the sensor body 10 to be housed abuts on the front wall 21D, which results in positioning of the sensor body 10 in a longitudinal direction L. The lead wires 13A and 13B are folded at a back end surface 27.

The housing groove 26 has a length and a width that are equal to or larger than a length and a width of a portion of the sensor body 10 covered with the cover layer 15. In addition, a depth of the housing groove 26 is set such that a portion of the sensor body 10 is exposed from the housing groove 26 in a state in which the sensor body 10 is inserted up to an inmost part of the housing groove 26, as illustrated in FIGS. 2A and 2C. The sensor body 10 comes into contact with the coil 100 that is a temperature detection object, through the portion exposed from the housing groove 26, thereby detecting temperature of the coil 100.

[Clip 30]

As illustrated in FIGS. 1A, 1B and FIGS. 2A to 2C, the clip 30 functions to press, through the insulation bracket 40, the coil 100 against a region including a position of the sensor body 10 at which the thermosensitive device 11 is provided.

As illustrated in FIG. 3 and FIG. 4, the clip 30 has a U-shaped form, and is shaped through a punching process and a bending process of a plate-like metal material such as a stainless steel plate. The clip 30 includes a fixing arm 31, a spring part 32, and a holding arm 33. The fixing arm 31 is fixed to the clip fixing part 22 and projects in a cantilever shape from the clip fixing part 22 to the outside in a width direction W. The spring part 32 is continuous with the fixing arm 31 and is suspended from the fixing arm 31 downward. The holding arm 33 is continuous with the spring part 32 and is provided substantially parallel to the fixing arm 31. Note that a substantially parallel state is described later. The fixing arm 31, the spring part 32, and the holding arm 33 have the same plate thickness and width. The holding arm 33 has locking pieces 34A and 34B that are provided near a boundary with the spring part 32. The locking pieces 34A and 34B respectively projects toward both sides in the width direction W.

As illustrated in FIGS. 1A, 1B and FIGS. 2A to 2C, the spring part 32 includes a connection end portion 32A connected to the fixing arm 31, and a connection end portion 32B connected to the holding arm 33. In the present embodiment, the connection end portion 32A has curvature smaller than curvature of the connection end portion 32B.

In addition, a rectangular lock hole 35 into which a lock claw 44 of the insulation bracket 40 is inserted is so provided in the holding arm 33 as to penetrate the holding arm 33.

The clip 30 presses the coil 100 against the sensor body 10 with main use of the elastic force of the spring part 32; however, the elastic force of the fixing arm 31 and the holding arm 33 also contributes to press the coil 100 against the sensor body 10.

Figure 5A:
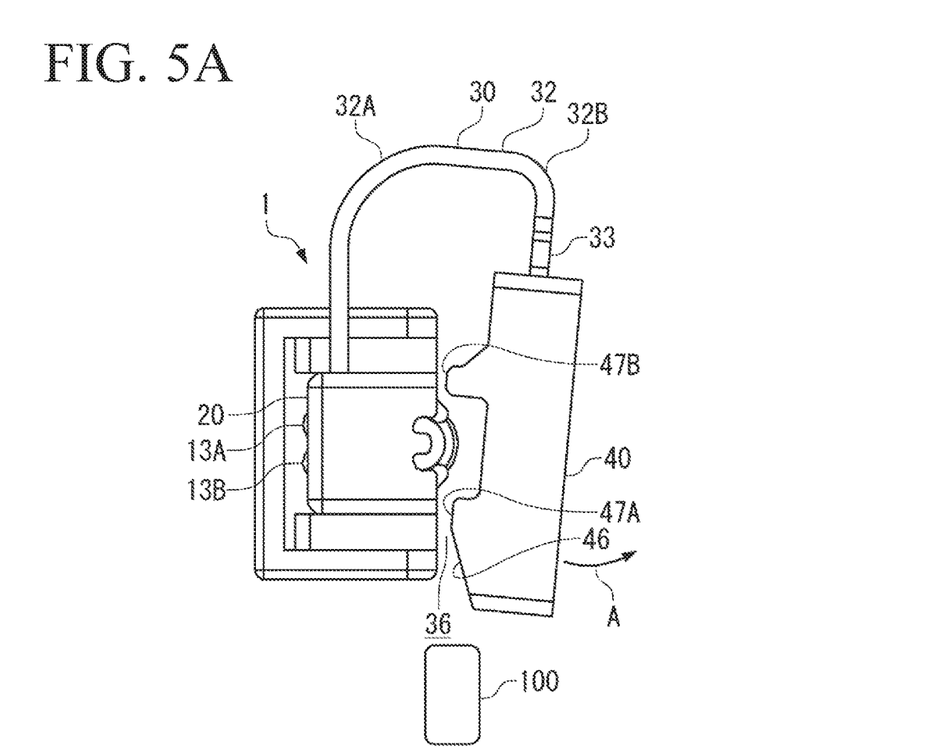

In addition, the fixing arm 31 is substantially parallel to the holding arm 33 as described above; however, a distance between the fixing arm 31 and the holding arm 33 is gradually decreased from the portion connected to the spring part 32 toward the front end of the holding arm 33 when no load is applied to the clip 30, namely, when the clip 30 does not hold the coil 100, as illustrated in FIG. 5A. In other words, the clip 30 has an opening 36 into which the coil 100 is inserted, on the front end of the holding arm 33, and the opening 36 is narrowed. The opening 36 of the holding arm 33 is forcibly expanded when the coil 100 is inserted from the opening 36.

[Insulation Bracket 40]

As illustrated in FIGS. 1A, 1B and FIGS. 2A to 2C, the insulation bracket 40 holds the coil 100 and presses the coil 100 against the sensor body 10 by the elastic force of the clip 30 while being attached to the holding arm 33 of the clip 30. The insulation bracket 40 is fabricated through injection molding of a resin, and has electric insulation property.

As illustrated in FIG. 3 and FIG. 4, the insulation bracket 40 includes a holding groove 41 that holds the coil 100, on a surface facing the sensor holder 20. The holding groove 41 is provided such that the coil 100 extends and penetrates through the holding groove 41 in the longitudinal direction L while the holding groove 41 is attached to the holding arm 33 of the clip 30. A size in the width direction W of the holding groove 41 is set to a size enough to receive the coil 100 without a gap.

The holding groove 41 is provided between a front upstanding part 47A and a rear upstanding part 47B on the surface of the insulation bracket 40 facing the sensor holder 20. The front upstanding part 47A is provided on the opening 36 side into which the coil 100 is inserted, and the rear upstanding part 47B is provided on the other side of the holding groove so as to be opposed to the front upstanding part 47A. In the present embodiment, as a preferred embodiment of the present invention, the front upstanding part 47A is smaller in height than the rear upstanding part 47B. In addition, the front upstanding part 47A includes a top surface facing the opening 36. The top surface configures the guide surface 46 that is inclined to gradually decrease a distance between the guide surface 46 and the opposing sensor holder 20 toward the holding groove 41. Note that the rear upstanding part 47B may have an optional form other than the height as long as the rear upstanding part 47B configures the holding groove 41, together with the front upstanding part 47A.

The insulation bracket 40 includes a holding hole 42 that holds the holding arm 33 when the holding arm 33 is inserted into the holding hole 42. The holding hole 42 opens on an opening end portion 45 that is one end of the insulation bracket 40 in the width direction W, and extends toward the other end in the width direction W up to a predetermined position.

The insulation bracket 40 includes a lock arm 43 that faces the holding hole 42, on the back surface. The lock arm 43 is formed in a cantilever shape in which the other end of the insulation bracket 40 in the width direction W serves as a fixed end, and includes a lock claw 44 on a free end. When the holding arm 33 of the clip 30 is inserted up to an inmost part of the holding hole 42 of the insulation bracket 40, the lock claw 44 is inserted into the lock hole 35 of the holding arm 33 and the locking pieces 34A and 34B of the holding arm 33 abut on the opening end portion 45 of the insulation bracket 40, as illustrated in FIG. 1A. As a result, the insulation bracket 40 is positioned and fixed to the holding arm 33, as illustrated in FIGS. 1A, 1B and FIGS. 2A to 2C.

[Lead Wire Fastener 50]

As illustrated in FIGS. 1A, 1B and FIGS. 2A to 2C, the lead wire fastener 50 is attached to the back end of the sensor holder 20 to form a space into which the folded portion R of the lead wires 13A and 13B of the sensor body 10 is inserted, and to fix the folded portion R of the lead wires 13A and 13B that are inserted into the space. This prevents the sensor body 10 from coming off from the housing groove 26 of the sensor holder 20 on the back end side. The lead wire fastener 50 is fabricated through injection molding of a resin, and has electric insulation property.

As illustrated in FIG. 3 and FIG. 4, the lead wire fastener 50 includes: a top wall 51, side walls 52A and 52B that are suspended from both sides of the top wall 51 in the width direction W; and a back wall 53 that is suspended from a back end of the top wall 51 and connects the side walls 52A and 52B to each other at the back end. A region surrounded by the top wall 51, the side walls 52A and 52B, and the back wall 53 open to the outside through the front surface and the bottom surface. The top wall 51 and the back wall 53 are uniformly continuous, whereas the lock holes 54A and 54B into which the lock claws 25A and 25B of the sensor holder 20 are respectively inserted are respectively so provided on the side walls 52A and 52B as to penetrate through the side walls 52A and 52B.

When the lead wire fastener 50 is attached to the predetermined position of the back end of the sensor holder 20, the lock claws 25A and 25B are respectively inserted into the lock holes 54A and 54B, which causes the lead wire fastener 50 to be positioned and to be fixed to the sensor holder 20, as illustrated in FIGS. 1A, 1B and FIGS. 2A to 2C. Further, the lead wires 13A and 13B of the sensor body 10 pass through the space between the back wall 53 of the lead wire fastener 50 and the back end surface 27 of the sensor holder 20, then pass through the space between the top wall 51 of the lead wire fastener 50 and the top wall 21C of the sensor holder 20, and are folded. The top wall 51 and the back wall 53 restrict the motion of the folded portion R of the lead wires 13A and 13B for returning to a linear shape, thereby preventing the sensor body 10 from coming off from the housing groove 26 of the sensor holder 20 on the back end side.

[Attachment to Coil 100]

The sensor body 10 is housed in the housing groove 26 of the sensor holder 20, the insulation bracket 40 is attached to the holding arm 33 of the clip 30, and the lead wire fastener 50 is attached to the sensor holder 20. As a result, the temperature sensor 1 is configured.

Figure 5B:
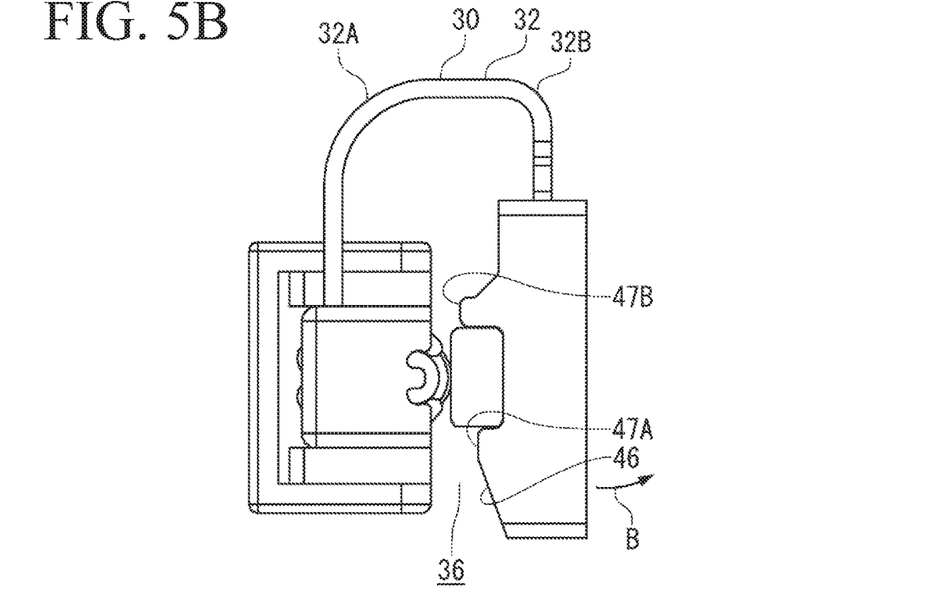

To attach the temperature sensor 1 to the coil 100, the temperature sensor 1 is disposed oppositely to the coil 100, and the holding arm 33 of the clip 30 is forcibly moved in a direction of an arrow A to expand the opening 36, as illustrated in FIG. 5A. The temperature sensor 1 is pushed from the expanded opening 36 toward the coil 100 and the coil 100 is inserted into the holding groove 41 of the insulation bracket 40 as illustrated in FIG. 5B, which causes the temperature sensor 1 to be attached to the coil 100. Since the opening 36 is expanded as compared with the opening 36 before the attachment to the coil 100, elastic force occurs on the clip 30, and the sensor body 10 is pressed against the coil 100.

In addition, for example, when the sensor body 10 is broken down and the sensor body 10 is accordingly replaced, the holding arm 33 of the clip 30 is forcibly moved in a direction of an arrow B from the state in FIG. 5B. This makes it possible to remove the temperature sensor 1 from the coil 100.

[Effects of Temperature Sensor 1]

Next, effects of the temperature sensor 1 are described.

The temperature sensor 1 is attached to or removed from the coil 100 through extremely simple work that the opening 36 of the clip 30 is forcibly expanded. Therefore, it is possible to easily replace the sensor body 10 without skilled technique. Furthermore, the present embodiment includes components reducing a load of the work that the sensor body 10 is attached to the coil 100, as described below.

First, in the present embodiment, the guide surface 46 is provided on the insulation bracket 40. Accordingly, the opening 36 is the widest on the side into which the coil 100 is inserted and narrows toward the holding groove 41. This facilitates attachment of the temperature sensor 1 to the coil 100. In other words, only pushing the coil 100 causes the coil 100 to be guided to the guide surface 46 and to pass through the guide surface 46 after the coil 100 is inserted into the opening 36.

Next, the rear upstanding part 47B has the height larger than that of the front upstanding part 47A, which facilitates the work to introduce the coil 100 into the holding groove 41. In other words, since the coil 100 abuts on the rear upstanding part 47B after passing through the guide surface 46 of the front upstanding part 47A, the coil 100 is positioned with respect to the holding groove 41 in the insertion direction without special consideration.

Further, since the temperature sensor 1 includes the clip 30 at the position corresponding to the front end of the sensor body 10 at which the thermosensitive device 11 is provided, the front end of the sensor body 10 at which the thermosensitive device 11 is provided comes into tight contact with the coil 100, which allows for temperature detection of the coil 100 with high accuracy. In addition, since clip 30 of the temperature sensor 1 is made of a metal excellent in heat resistance and durability as compared with a resin, the force of pressing the sensor body 10 against the coil 100 is maintained for a long time. This makes it possible to stably secure temperature detection with high accuracy for a long time.

Moreover, the temperature sensor 1 indirectly applies the elastic force of the clip 30 to the coil 100 through the insulation bracket 40. This makes it possible to reduce influence of surrounding temperature to the temperature variation of the coil 100. In other words, the insulation bracket 40 blocks transfer of surrounding heat to the coil 100 through the metal clip 30 having large thermal conductivity while realizing electric insulation between the coil 100 and the clip 30. In addition, since the back surface of the sensor body 10, namely, the side that is opposite to the side brought into tight contact with the electric wire is covered with the insulation bracket 40, it is possible to block transfer of radiated heat from surroundings to the sensor body 10. Further, the elastic force of the clip 30 is adjustable by selecting a metal material to be used, a thickness of each component of the clip 30, or the like. This makes it possible to surely set the pressing force necessary for the temperature detection. Consequently, it is possible for the temperature sensor 1 to perform temperature detection with high accuracy in the above-described terms.

In addition, when the curvature of the connection end portion 32A of the spring part 32 is made small and the curvature of the other connection end portion 32B is made large, the clip 30 according to the present embodiment exerts the following effects.

The rigidity of the spring having a curvature part is typically determined by magnitude of the curvature, and the rigidity is increased as the curvature is increased. Therefore, deformation of the spring part 32 when the sensor body 10 is attached to the coil 100 occurs around the connection end portion 32A having small curvature. The opening between the sensor holder 20 and the insulation bracket 40 is expanded in response to the deformation. Optimizing the curvature improves workability in attachment of the sensor body 10 to the coil 100.

Note that, depending on the shape and the size of the sensor holder 20 and the insulation bracket 40, increasing the curvature of the connection end portion 32A and decreasing the curvature of the connection end portion 32B make it possible to improve attachment workability.

Furthermore, in the temperature sensor 1, the sensor holder 20 holds, through the coil 100, the sensor body 10 by the elastic force of the clip 30 on the front end side, and the sensor holder 20 holds the sensor body 10 through restriction of the motion of the folded portion of the lead wires 13A and 13B by the lead wire fastener 50 on the back end side. This causes the sensor body 10 to be stably held by the housing groove 26 of the sensor holder 20. Even if vibration is applied to the coil 100 and the temperature sensor 1, it is possible to suppress reduction of accuracy of the detected temperature caused by displacement of the sensor body 10.

Hereinbefore, the preferred embodiment of the present invention is described; however, the configurations described in the above-described embodiment may be selected or appropriately modified without departing from the scope of the present invention.

For example, the material of the clip 30 is not limited to the metal material as long as the clip 30 generates the elastic force, and the clip 30 may be made of a resin. This makes it possible to omit provision of the insulation bracket 40, and allows for integral formation of the clip 30 and the sensor holder 20 through injection molding. This results in reduction of the number of members.

Further, the temperature sensor 1 includes the clip 30 on the front end side corresponding to the thermosensitive device 11 of the sensor body 10; however, the position at which the clip 30 is provided is optional as long as the coil 100 is brought into tight contact with the site at which the thermosensitive device 11 of the sensor body 10 is provided. For example, when the clip 30 is provided at a center of the sensor holder 20 in the longitudinal direction L, namely, near a centroid of the temperature sensor 1, the temperature sensor 1 is balanced in attachment of the temperature sensor 1 to the coil 100. This facilitates the attachment work.

Moreover, the temperature sensor 1 includes only one clip 30 on the front end of the sensor holder 20; however, the temperature sensor 1 may further include a similar clip 30 on the back end of the sensor holder 20, and the coil 100 may be pressed against the sensor body 10 by the two clips 30. This makes it possible to more stably attach the temperature sensor 1 to the coil 100.

In addition, the temperature sensor 1 is assumed to be attached to the coil 100 that serves as a neutral line provided in the stator of the rotary electric machine. The object of the temperature detection, however, is not limited to the neutral line.

Further, the temperature sensor 1 holds the lead wires 13A and 13B in the folded state by the lead wire fastener 50; however, the drawing form of the lead wires is optional, and for example, the lead wires 13A and 13B may be straightly drawn without being folded. In addition, the temperature sensor 1 supports the sensor body 10 by the lead wire fastener 50 through the lead wires 13A and 13B on the back end side; however, the support on the back end side of the sensor body 10 is optional and is not limited to the embodiment.

REFERENCE SIGNS LIST

1 Temperature sensor
10 Sensor body
11 Thermosensitive device
12A, 12B Lead-out wire
13A, 13B Lead wire
14A, 14B Cover layer
15 Cover layer
20 Sensor holder
21 Holder body
21A, 21B Side wall
21C Top wall
21D Front wall
22 Clip fixing part
23 Fastener fixing part
24A, 24B Spacer
25A, 25B Lock claw
26 Housing groove
27 Back end surface
30 Clip
31 Fixing arm
32 Spring part
32A, 32B Connection end portion
33 Holding arm
34A, 34B Locking piece
35 Lock hole
36 Opening
40 Insulation bracket
41 Holding groove
42 Holding hole
43 Lock arm
44 Lock claw
45 Opening end portion
46 Guide surface
47A Front upstanding part
47B Rear upstanding part 50 Lead wire fastener
51 Top wall
52A, 52B Side wall
53 Back wall
54A, 54B Lock hole
100 Coil

What is claimed is:

1. A temperature sensor that is attached to a rectangular electric wire and detects a temperature of the electric wire, the temperature sensor comprising:
    a sensor holder having a front end side and a back end side;
    a sensor body having a thermosensitive device and lead wires drawn from the thermosensitive device, the sensor body being held by the sensor holder such that the thermosensitive device is located on the front end side and the lead wires are drawn from the thermosensitive device toward the back end side, the lead wires being electrically connected to the thermosensitive device; and
    a clip that is fixed to the sensor holder and presses the electric wire against the sensor body by elastic force.

2. The temperature sensor according to claim 1, further comprising a lead wire fastener that is fixed to the sensor holder, wherein
    the lead wires of the sensor body are folded toward the front end side at the back end side of the sensor holder, and
    the lead wire fastener holds a folded portion of the lead wires.

3. The temperature sensor according to claim 1, wherein the clip is fixed on the front end side of the sensor holder, and presses, by the elastic force, the electric wire toward a region of the sensor body at which the thermosensitive device is provided.

4. The temperature sensor according to claim 3, further comprising a lead wire fastener that is fixed to the sensor holder, wherein
    the lead wires of the sensor body are folded toward the front end side at the back end side of the sensor holder, and
    the lead wire fastener holds a folded portion of the lead wires.

5. The temperature sensor according to claim 3, wherein the clip is made of a metal plate that is bent in a U-shape,
    the clip includes a fixing arm, a spring part, and a holding arm, the fixing arm being integrally fixed to the sensor holder and projecting in a cantilever shape to outside of the sensor holder in a width direction, the spring part being continuous with the fixing arm, and the holding arm being continuous with the spring part and facing the fixing arm with a predetermined distance in between, and
    the clip presses the electric wire against the sensor body through an insulation bracket, the insulation bracket being provided on the holding arm.

6. The temperature sensor according to claim 5, wherein a connection end portion of the spring part connected to the fixing arm has a curvature different from a curvature of a connection end portion of the spring part connected to the holding arm.

7. The temperature sensor according to claim 5, wherein the clip defines an opening into which the electrical wire is inserted from an opening side of the opening,
    the insulation bracket includes a holding groove that holds the electric wire, on a side facing the sensor holder,
    the holding groove is provided between a front upstanding part and a rear upstanding part on the side of the insulation bracket facing the sensor holder, the front upstanding part being provided on a first side of the holding groove, and the rear upstanding part being provided on a second side of the holding groove opposite to the first side, the first side being closer to the opening side of the clip than the second side, and
    the front upstanding part has a height lower than a height of the rear upstanding part.

8. The temperature sensor according to claim 1, wherein the clip is made of a metal plate that is bent in a U-shape,
    the clip includes a fixing arm, a spring part, and a holding arm, the fixing arm being integrally fixed to the sensor holder and projecting in a cantilever shape to an outside of the sensor holder in a width direction, the spring part being continuous with the fixing arm, and the holding arm being continuous with the spring part and facing the fixing arm with a predetermined distance in between, and
    the clip presses the electric wire against the sensor body through an insulation bracket, the insulation bracket being provided on the holding arm.

9. The temperature sensor according to claim 8, further comprising a lead wire fastener that is fixed to the sensor holder, wherein
    the lead wires of the sensor body are folded toward the front end side at the back end side of the sensor holder, and
    the lead wire fastener holds a folded portion of the lead wires.

10. The temperature sensor according to claim 8, wherein a connection end portion of the spring part connected to the fixing arm has a curvature different from a curvature of a connection end portion of the spring part connected to the holding arm.

11. The temperature sensor according to claim 10, further comprising a lead wire fastener that is fixed to the sensor holder, wherein
    the lead wires of the sensor body are folded toward the front end side at the back end side of the sensor holder, and
    the lead wire fastener holds a folded portion of the lead wires.

12. The temperature sensor according to claim 8, wherein the clip defines an opening into which the electrical wire is inserted from an opening side of the opening,
    the insulation bracket includes a holding groove that holds the electric wire, on a side facing the sensor holder,
    the holding groove is provided between a front upstanding part and a rear upstanding part on the side of the insulation bracket facing the sensor holder, the front upstanding part being provided on a first side of the holding groove, and the rear upstanding part being provided on a second side of the holding groove opposite to the first side, the first side being closer to the opening side of the clip than the second side, and
    the front upstanding part has a height lower than a height of the rear upstanding part.

13. The temperature sensor according to claim 12, further comprising a lead wire fastener that is fixed to the sensor holder, wherein
    the lead wires of the sensor body are folded toward the front end side at the back end side of the sensor holder, and
    the lead wire fastener holds a folded portion of the lead wires.

14. The temperature sensor according to claim 12, wherein the front upstanding part includes a top surface facing the opening, the top surface defining a guide surface that is inclined to gradually decrease a distance between the guide surface and the sensor holder along a direction toward the holding groove.

15. The temperature sensor according to claim 14, further comprising a lead wire fastener that is fixed to the sensor holder, wherein the lead wires of the sensor body are folded toward the front end side at the back end side of the sensor holder, and the lead wire fastener holds a folded portion of the lead wires.

* * * * *